(12) United States Patent
Branch

(10) Patent No.: US 6,465,064 B1
(45) Date of Patent: Oct. 15, 2002

(54) COMPOSITIONS AND ARTICLES PRODUCED THEREFROM

(75) Inventor: Mark Graham Branch, Ashby-de-la-Zouch (GB)

(73) Assignee: Betts UK Limited (GB)

( * ) Notice: Subject to any disclaimer, the term of this patent is extended or adjusted under 35 U.S.C. 154(b) by 0 days.

(21) Appl. No.: 08/849,582

(22) PCT Filed: Dec. 1, 1995

(86) PCT No.: PCT/GB95/02815

§ 371 (c)(1),
(2), (4) Date: Aug. 4, 1997

(87) PCT Pub. No.: WO96/17885

PCT Pub. Date: Jun. 13, 1996

(30) Foreign Application Priority Data

Dec. 3, 1994 (GB) .............................................. 9424472

(51) Int. Cl.⁷ ........................... B29D 23/20; B32B 5/16; B65D 35/08
(52) U.S. Cl. ...................... 428/35.4; 106/415; 264/115; 264/328.1; 264/328.18; 264/330; 264/331.11; 264/331.15; 428/36.4; 428/36.6; 428/36.7; 428/36.9; 428/323; 428/331; 524/451; 524/584; 524/586
(58) Field of Search ............................... 428/35.2, 35.4, 428/35.7, 36.4, 36.6, 36.7, 36.9, 323, 331; 524/451, 584, 586; 106/623, 469, 415; 264/328.18, 328.1, 115, 330, 331.11, 331.15

(56) References Cited

U.S. PATENT DOCUMENTS

| 800,838 A | * 10/1905 | Speirs .................... 264/115 |
| 3,463,350 A | 8/1969 | Unger .................... 220/83 |
| 4,102,974 A | * 7/1978 | Boni ..................... 264/294 |
| 4,526,823 A | * 7/1985 | Farrell et al. ............. 428/35 |
| 4,528,235 A | 7/1985 | Sacks et al. .............. 428/220 |
| 4,536,425 A | 8/1985 | Hekal .................... 428/35 |
| 4,814,019 A | * 3/1989 | Weber .................... 106/469 |
| 4,980,390 A | * 12/1990 | Shorr et al. .............. 523/1 |
| 5,091,461 A | * 2/1992 | Skochdopole .............. 524/493 |
| 5,635,562 A | * 6/1997 | Malcolm .................. 525/108 |

FOREIGN PATENT DOCUMENTS

| EP | 0590263 | 4/1994 | |
| EP | 754 531 | 1/1997 | |
| GB | 1136350 | 12/1968 | |
| WO | WO93/04118 | 3/1993 | |
| WO | WO 96/06136 | 2/1996 | |
| WO | WO 9744382 A | * 11/1997 | ............ C08K/3/34 |

* cited by examiner

Primary Examiner—Sandra M. Nolan
(74) Attorney, Agent, or Firm—Howson and Howson

(57) ABSTRACT

Compositions having improved gas/vapor barrier qualities are described. The compositions are composed of a substantially non-polar resin and a lamellar filler, the lamellar filler delaminating under high shear, to increase its aspect ratio. Also described are compositions composed of a non-polar thermoplastic resin filled with platelets of talc having an aspect ratio of at least 5; the platelets have an average aspect ratio of between 16–30 and a CIE whiteness index of at least 40.

20 Claims, No Drawings

COMPOSITIONS AND ARTICLES PRODUCED THEREFROM

FIELD OF THE INVENTION

This invention concerns thermoplastics compositions are articles made therefrom having gas and vapour barrier properties.

BACKGROUND OF THE INVENTION

Thermoplastic materials are widely used in packaging because of their low cost and ease of forming into a variety of shapes. However, most thermoplastics materials suffer from the disadvantage of providing only a relatively poor barrier to gases and vapours. Poor gas barrier is a particular disadvantage in packaging oxygen sensitive materials such as foodstuffs which are to be stored unrefrigerated. Poor vapour barrier properties are a disadvantage when packaging materials which are sensitive to moisture vapour, for example foodstuffs and confectionery which lose condition when they become damp, and they are also a disadvantage when the packaged material includes flavouring components which diffuse through the packaging material with consequent loss of flavour.

A number of attempts have been made at improving the gas barrier properties of thermoplastics materials. GB-A-1136350, for example, proposes the use of circular platelike fillers with a ratio of diameter to thickness between 20:1 and 300:1 and a diameter of at most 40 $\mu$m in polyolefin polymers selected from polyethylene, polypropylene, ethylene-containing copolymers containing at least 50 moles percent of ethylene, and polystyrene, the preferred amount of filler being 0.1 to 50 wt % of the total weight of filled polymer. Such filled polymer compositions are proposed to be used to manufacture films, for example for food packaging.

U.S. Pat. No. 3,463,350 is concerned with the production of moulded containers for packaging foodstuffs, the containers being made from mixtures of high density polyethylene (HDPE) and mica particles, for example by compression or injection moulding. Such containers are said to reduce the discolouration of so-called canned cornbeef as caused by oxygen compared with the use of similar containers made of HDPE filled with glass fibre or titanium dioxide instead of mica.

It has also been proposed in U.S. Pat. No. 4,528,235 to incorporate platelet filler particles with an average equivalent diameter of from 1 to 8 $\mu$m, the maximum diameter being 25 $\mu$m, and thickness of less than 0.5 $\mu$m, into HDPE having a melt index of from 0.01 to 1.0 g/10 minutes at 190° C. as measured by ASTM D-1238 to produce films having a thickness of from 10 to 100 $\mu$m, with the intention of increasing the oxygen barrier of the films compared with films formed from unfilled HDPE.

Despite the apparent improvements in oxygen barrier resulting from these various hitherto proposed methods using lamellar fillers to impart oxygen barrier properties to polyolefins, even higher oxygen barrier properties have been sought. Thus U.S. Pat. No. 4,536,425 proposes increasing the gas barrier properties of polar thermoplastics resins, for example alkylene terephthalates, by blending the resins with mica flakes having a plurality of platelets using a shear force which effects delamination of the mica platelets and thereby a substantial increase in the aspect ratio of the flakes. Delamination of the mica flakes is said to occur as a result of shear forces generated during mixing of the resin with the mica being transferred to the mica flakes due to chemical bonding of silanol on the surface of the flakes to hydroxyl and carboxyl groups formed in the resin as a result of hydrolysis of ester groups in the resin at the temperature involved. This document goes on to state that the continuous delamination effect with polar thermoplastic resins is not encountered with non-polar resins such as unmodified polyethylene or polypropylene resins since non-polar resins do not normally form any appreciable adhesive covalent bonds with the mica platelet surfaces.

SUMMARY OF THE INVENTION

According to the present invention there is provided a method of making a moulding composition for forming an article having increased barrier to gases and/or vapours, the method comprising the step of mixing together a substantially non-polar thermoplastic resin together with a laminar filler, the laminar filler being capable of delaminating when the composition is subjected to high shear to increase the aspect ratio of the filler as it breaks down into platelets.

Compositions in accordance with the present invention have been found to provide a good barrier not only to oxygen but also to flavour molecules. A particularly preferred use of compositions in accordance with the present invention is as shoulders for toothpaste tubes. Whereas it is relatively easy to form the tubular part of such tubes from a rigid or flexible polymer laminate having barrier properties by the use of multi-layer structures including a layer of a polymer having barrier properties, for example ethylene/vinyl alcohol copolymers, this is not possible for the shoulder portion of such tubes. The result has been that the shoulders have had to be moulded from expensive thermoplastic resins or inserts of a barrier resin have had to be made and located within a shoulder having a low inherent barrier to flavour molecules, again leading to increased costs.

The non-polar thermoplastic resin is preferably a polyolefin resin, for example a polymer derived from one or more aliphatic or aromatic alkene, eg a polymer containing units derived from at least one of ethylene, propylene, but-1-ene and styrene. Examples of specific polyolefin resins which can be used include polyethylene, polypropylene, ethylene/propylene copolymers, ethylene, propylene/but-1-ene terpolymers, polyethylenes being particularly preferred by virtue of their good injection moulding characteristics. The polyethylene can be low density polyethylene (density 0.910 to 0.925 g.cm$^{-3}$), medium density polyethylene (density 0.925 to 0.950 g.cm$^{-3}$) or high density polyethylene (density 0.950 to 0.980 g.cm$^{-3}$). High density polyethylene is particularly preferred by virtue of its higher inherent barrier properties compared with lower density polyethylenes.

The platelet filler can be any of a variety of lamellar fillers provided the platelets delaminate under shear as is encountered when the filler is blended with the non-polar resin before injection moulding and more particularly when the mixture of filler and resin is subjected to injection moulding. Lamellar fillers include clays, mica, graphite, montmorillonite and talc. Talc is particularly preferred by virtue of its ease of delamination during shear.

The filler should have a structure consisting of platelets both before and after being subjected to high shear. As will be appreciated, in addition to delamination, subjecting such fillers to high shear also tends to reduce their effective diameter. However, despite a reduction in the effective diameter of the filler particles, high shear generally results in an increase in the aspect ratio of the individual filler particles.

Talc, being a naturally occurring hydrated magnesium silicate, is available in a variety of grades of greater or lesser purity. It has surprisingly been found that the ease of increasing the aspect ratio of talc when it is subjected to high shear in a non-polar thermoplastic resin appears to increase as the level of impurities within the talc decreases. Thus not only does it appear easier to delaminate the platelets of the talc, but the platelets themselves apparently resist fracture.

According to another aspect of this invention there is provided a composition for forming an article having increased barrier to gases and/or vapours, the composition comprising a substantially non-polar thermoplastic resin filled with platelets of talc having an aspect ratio of at least 5 and an average aspect ratio of between 16–30 and a CIE whiteness index of at least 40.

Whatever the mechanism by which the aspect ratio of some talcs is increased to a particularly high degree when they are subjected to high shear in non-polar thermoplastic resins, it has surprisingly been found that talcs which result in compositions in accordance with the invention having high values of CIE (Commission Internationale d'Eclairage) whiteness index are produced from talcs which delaminate relatively easily and resist fracture, that is they resist reduction in their diameter when sheared. Delamination of the talc has usually been found to occur if the CIE whiteness index of the composition after shearing is at least 40, and a significant increase in aspect ratio has usually occurred if the CIE index of the composition after shearing is at least 45. These CIE whiteness index values were determined for compositions containing 15 percent by weight of talc in high density polyethylene with no other filler present, the determination being in reflectance mode with UV light included and specular reflection excluded, the observer angle being 10° and the samples being backed by a white tile.

Purer grades of talc are therefore generally preferred since it would appear that they lead to compositions in accordance with the invention which not only have good barrier properties but also high degrees of whiteness without the necessity to include a white pigment such as titanium dioxide.

Particularly preferred grades of talc for use in the present invention are sold by Richard Baker Horizon Group, England, under the Trade Mark "Magsil", an especially preferred grade being *"Magsil osmanthus"*.

Before being subjected to high shear, the filler particles preferably have an average particle diameter of not more than 100 μm, more preferably not more than 50 μm, and most preferably not more than 20 μm. The particle thickness of the filler can also vary over a wide range, but it is preferably less than 10 μm before being subjected to high shear, and more preferably less than 5 μm thick.

The particularly preferred grade of talc referred to above as *Magsil osmanthus* typically has an average particle diameter of about 20 μm and a thickness of about 2.5 μm before being subjected to high shear.

The filler used in accordance with the present invention is reduced in thickness as a result of high shear, and this in general increases the aspect ratio of the filler particles even though thickness reduction is usually accompanied by a reduction in the average diameter of the filler particles. A typical increase in the aspect ratio of the filler particles is by a factor of at least 1.8, and preferably by at least three. For example, filler particles with an original aspect ratio of about 7 have had their aspect ratio increased to about 15 or more, for example to in excess of 21.

The high shear to which the filler particles are subjected in accordance with the present invention can be applied by various methods. It is particularly preferred to apply high shear during compounding prior to forming desired articles so that delamination of the filler particles is effected before forming the desired articles. Further delamination can also be effected during the forming step. It is generally preferred, however, to effect most of the delamination during the compounding operation, the preferred compounding operation being the use of a twin screw extruder or a Banbury mixer.

In addition to delamination of the filler particles, it is generally preferred to effect moulding of the filled resin under conditions which cause the filler particles to become oriented such that their larger face is substantially aligned with the surface of the mouldings. This is particularly effectively achieved by injection moulding the filled resin, and injection moulding has also led to a particularly effective delamination of the filler particles, thereby leading to an especially good barrier to flavour molecules.

Orientation of the filler particles can also be effected by extruding compositions in accordance with the present invention. The compositions can be extruded in various forms, for example films or tubes, having increased barrier properties. They can be extruded as a single web, or they can be coextruded with other layers on one or other side of a core layer formed from a composition in accordance with the present invention. For example films or tubes produced from compositions in accordance with the present invention can be used to form the body portion of toothpaste tubes, and a particularly preferred combination is of a tubular body portion made from a composition in accordance with the present invention in combination with a shoulder portion made from a composition in accordance with the present invention.

Although of particular value in the production of toothpaste tubes, it will be appreciated by those skilled in the art that the end use of the tubes can be for any purpose, but uses exploiting the particularly good barrier properties of compositions in accordance with the present invention are particularly preferred, especially after a forming operation in which the filler particles become aligned parallel to the surface of the formed articles produced therefrom.

DESCRIPTION OF THE PREFERRED EMBODIMENTS

The following Examples are given by way of illustration only.

In the Examples, oxygen permeability was measured using a Mocon 100 twin oxygen transmission rate tester. The oxygen permeability of the toothpaste tube shoulders were measured according to ASTM D39885-81.

The CIE whiteness index values was measured under the conditions described above using a Macbeth spectrophotometer 2020-.

The mean diameter and thickness of the talc particles were measured by scanning electron microscopy of either the talc used initially or the talc within the polymer matrix as appropriate.

The flavour barrier of the toothpaste tube shoulder was assessed by the percentage loss of eucalyptol through the shoulder using the following method.

Each injection moulded shoulder being tested was air welded to a plastics laminate tube consisting of five layers, the two outer layers being of polyethylene and the centre layer being a barrier layer of an ethylene/vinyl alcohol copolymer, the two intermediate layers being of a tie polymer to tie the polyethylene layers to the barrier layer. A known weight (about 0.1 g) of eucalyptol was introduced into the tube with attached shoulder, and the tube and shoulder were both sealed. As a control, a similar and known amount of eucalyptol was sealed into a tube consisting of only the five layer barrier laminate.

The sealed tubes were then sealed for 7 days at 70° C., and the weight loss of the tubes was evaluated as a percentage of the original amount of eucalyptol in the tube. The control tube showed no weight loss during the seven day test period, and any weight loss from the other tubes was therefore assumed to have resulted from loss of eucalyptol through the various shoulders.

Example 1

15 parts by weight of talc (*Magsil osmanthus*, average particle diameter 17.4 $\mu$m and average thickness 2.5 $\mu$m—ex Richard Backer Horizon, England) in the form of a dry powder and 85 parts by weight of high density polyethylene (density 0.964 g/cm$^3$, melt flow index 8 g/10 min (2160 g load at 190° C.) measured to ISO/IEC1133—Lupolen 6031 m, ex BASF) in the form of pellets were premixed.

The premix was fed into a twin screw extruder with a temperature profile ranging from 150 to 220° C. where it was subjected to high shear and then extruded as a 3 $\mu$m diameter strand which was cut into pellets as it was being extruded. The talc in the resulting pellets had an average diameter as assessed by scanning electron microscopy of 6.94 $\mu$m and an average thickness of 0.53 $\mu$m. This corresponds to an aspect ratio of approximately 13 compared with 7 before its having been subjected to high shear.

The talc filled HDPE pellets were then injection moulded into toothpaste tube shoulders at 220–250° C. using a 32 impression hot runner tooling. The average thickness of the resulting tube shoulders was 1 mm.

Instead of injection moulding, some of the pellets were subjected to high shear using a Rosand Rheometer, the rate of shear applied to the molten pellets being increased from 170s$^{-1}$ to 16,000s$^{-1}$. This resulted in the aspect ratio of the talc being increased to 23.

The oxygen transmission rate for the injection moulded toothpaste tube shoulders was 0.008 cm$^3$/shoulder.atm.day compared with 0.01555 cm$^3$/shoulder.atm.day for shoulders injection moulded from the same high density polyethylene but without the talc.

The percentage loss of eucalyptol from a sealed toothpaste tube including a shoulder filled with talc as described was 14.4 after seven days at 70° C., compared with 62.3 for a similar tube having a shoulder made from the same but unfilled HDPE.

Example 2

The method of Example 1 was repeated by mixing either 20 parts by weight of the same talc with 80 parts by weight of the same HDPE or 25 parts by weight of the same talc with 75 parts by weight of the same HDPE to form two premixes. The premixes were then used to form toothpaste tube shoulders using the method of Example 1.

The oxygen transmission rates of the shoulders were 0.00713 and 0.00688 cm$^3$/shoulder.atm.day, respectively, and the percentage losses of eucalyptol after seven days at 70° C. were 21.9 and 18.3, respectively.

Example 3 (Comparison)

15 parts by weight of talc (Micro Talc IT Extra, mean particle diameter 5.64 $\mu$m, thickness 0.34 $\mu$m, and an aspect ratio 16.6—ex Norwegian Talc AS) in the form of a dry powder and 85 parts by weight of the HDPE used in Example 1 were premixed and the premix was then fed into a twin screw extruder as in Example 1 where it was formed into filled HDPE pellets. The mean particle diameter of the talc particles was 2.98 $\mu$m and their thickness was 0.21 $\mu$m, representing an aspect ratio of 14.3. Under the conditions described in Example 1, these pellets were used to form injection moulded toothpaste tube shoulders.

The oxygen permeability of the resulting shoulders was 0.01025 cm$^3$/shoulder.atm.day, and the percentage eucalyptol loss was 20.2 after seven days at 70° C.

Example 4

15 parts by weight of talc (*Magsil osmanthus* as used in Example 1) in the form of a dry powder and 85 parts by weight of the HDPE pellets used in Example 1 were premixed and then melt blended in a Banbury mixer at 220° C. before being injection moulded to form toothpaste tube shoulders as described in Example 1.

The resulting toothpaste tube shoulder had an oxygen transmission rate of 0.008 cm$^3$/shoulder.atm.day and showed a percentage weight loss of eucalyptol after seven days at 70° C. of 16.9.

Example 5

39 parts by weight of talc (*Magsil osmanthus* as used in Example 1) in the form of a dry powder and 61 parts by weight of the HDPE pellets used in Example 1 were preblended and then extruded into filled pellets as described in Example 1.

The filled HDPE pellets were than used as a masterbatch by blending them with further HDPE pellets at a let down ratio of master batch to unfilled HDPE of 1:2 by weight to form injection moulded toothpaste tubes using the method described in Example 1.

No visual differences were apparent between the resulting injection moulded shoulder and the shoulders produced in Example 1.

Example 6

10 percent by weight of talc (*Magsil osmanthus*) was melt blended with 90 percent by weight of high density polyethylene using a twin screw extruder, the resulting blend being extruded and cut into pellets.

In one experiment the resulting pellets were then extruded in the form of a toothpaste tube body consisting of a monolayer of the blend and having a thickness of 460 $\mu$m. In another experiment the resulting pellets were extruded as a flat monoweb film having a thickness of 350 $\mu$m, the monoweb then being formed into a toothpaste tube body.

Example 7

The procedure of Example 6 was repeated but using linear low density polyethylene instead of the high density polyethylene, and then extruding the pellets to form a tube or a film as described in Example 6.

Example 8

25 parts by weight of talc (*Magsil osmanthus*) and 75 parts by weight of high density polyethylene were melt blended in a twin screw extruder, and the blend was then extruded and the extrudate was cut into pellets.

The pellets were then used to form the core layer of two coextrudates. In each case the coextrudates consisted of a core layer formed from the blend, with a layer of linear low density polyethylene on either side of the core layer. The first coextrudate was in the form of a tube for toothpaste tube bodies with the outside layer being unfilled linear low density polyethylene 260 μm thick, the core of the blend being 50 μm thick, and the inside layer being 150 μm thick. The second coextrudate consisted of a flat film having two 100 μm thick unfilled outer layers of linear low density polyethylene, with a core layer formed of the talc/high density polyethylene blend. The flat film was then formed into the body of a toothpaste tube.

The tubes formed in Examples 6 to 8 inclusive all showed good barrier properties to both oxygen and flavour agents.

A number of different grades of talc and a single grade of mica (Microfine P66) were each blended with melts of HDPE or polypropylene in a weight ratio of 15 parts of filler to 85 parts of polymer using a twin screw extruder, the mixture being subjected to high shear during mixing prior to extrusion, the mixture being extruded and cut into pellets.

The resulting pellets were then compression moulded to form test samples for CIE whiteness index determinations. The moulded samples were in the form of plaques which were compressions moulded at 150° C. under a pressure of 0.39 tonnes per cm² for 5 minutes.

The aspect ratio of the talc was measured before mixing and in the pellets after estrusion and cutting.

The results of the various determinations are given in the accompanying Table which also lists the aspect ratio of the filler before and after mixing with the particular polymer.

TABLE 1

| Filler | Polymer | Whiteness (CIE Index) | Filler Aspect Ratio | |
|---|---|---|---|---|
| | | | Before Mixing | After Shear |
| Talcs | | | | |
| Magsil 2628 | HDPE | | 7.22 | 15.29 |
| Magsil Superstar | HDPE | | 8.68 | 17.29 |
| Magsil osmanthus | HDPE | 56.3 | 7.1 | 13.1 |
| Magsil osmanthus | PP | | 7.1 | 13.32 |
| Norwegian talc | HDPE | 42.1 | 16.1 | 14.3 |
| Luzenac 8218 | HDPE | 35.6 | 13.9 | 13.3 |
| Mica | | | | |
| Microfine P66 | HDPE | | 28.4 | 17.8 |

What is claimed is:

1. A method of making a moulding composition for forming an article for packaging foodstuffs or toothpaste having increased barrier to gases and/or vapours, said method comprising the steps of:
   high shear mixing together a substantially non-polar thermoplastic resin with a lamellar filler comprising talc, the lamellar filler being delaminated when the composition is subjected to high shear to increase the aspect ratio of the filler as it breaks down into platelets, wherein the moulding composition after said high shear mixing has a CIE whiteness index of at least 45; and
   forming the moulding composition into an article for packaging foodstuffs or toothpaste, wherein the oxygen transmission rate of the article is decreased when compared to that of an article made without delaminated talc.

2. A method as claimed in claim 1, wherein the high shear is effected during mixing before the composition is shaped into a finished article.

3. A method as claimed in claim 1, wherein the non-polar resin is a polyolefin.

4. A composition for forming an article for packaging having increased barrier to gases and/or vapours, the composition comprising a substantially non-polar thermoplastic resin and a platelet talc filler which has been subjected to high shear to effect delamination of the talc, wherein the talc has an aspect ratio of at least 5 and the composition has a CIE whiteness index of at least 45.

5. A composition according to claim 4, wherein the non-polar thermoplastic resin is a polyolefin resin.

6. A composition according to claim 5, wherein the polyolefin resin comprises polyethylene, polypropylene, polystyrene or a copolymer including units derived from at least two of ethylene, propylene and but-1-ene.

7. A composition according to claim 6, wherein the non-polar thermoplastic resin comprises a high density polyethylene.

8. A composition according to claim 4, wherein the platelets of talc have a mean diameter of 2 to 8 μm.

9. A composition according to claim 8, wherein the platelets of talc have a mean diameter of 4 to 8 μm.

10. A composition according to claim 4, having a CIE whiteness index greater than 55.

11. An injection molded article for packaging foodstuffs or toothpaste produced from a composition according to claim 4.

12. An article for packaging foodstuffs or toothpaste produced from a composition according to claim 4 in the form of a tube or film.

13. An article according to claim 12 for incorporation into a toothpaste tube.

14. A composition as claimed in claim 4, wherein the polyolefin is high density polyethylene and the composition comprises 15% by weight of talc filler.

15. An injection moulded article according to claim 11 in the form of a toothpaste tube shoulder.

16. A method according to claim 1, wherein the high shear is effected by injection molding of the composition.

17. A method according to claim 1, wherein the average aspect ratio of the filler is increased by a factor of at least 1.8.

18. A method according to claim 1, wherein the filler particles before being subjected to the high shear have an average particle diameter of not more than 20 μm.

19. A method according to claim 1, wherein the filler has an average particle diameter of about 17.4 μm and an average particle thickness of about 2.5 μm.

20. A composition for forming an article for packaging foodstuffs or toothpaste having increased barrier to gases and/or vapors and which is made by the method according to claim 1.

* * * * *